United States Patent [19]
Henning

[11] 4,195,393
[45] Apr. 1, 1980

[54] JUBILEE CLIP FASTENING
[76] Inventor: Wolfgang H. Henning, 3538 Marsberg, Fed. Rep. of Germany
[21] Appl. No.: 883,389
[22] Filed: Mar. 6, 1978
[30] Foreign Application Priority Data
Mar. 11, 1977 [DE] Fed. Rep. of Germany ....... 2710751
[51] Int. Cl.² ............................................ B65D 63/00
[52] U.S. Cl. ..................................................... 24/280
[58] Field of Search ................. 24/275, 276, 279, 280, 24/281, 282; 285/245, 253, 367, 407, 410
[56] References Cited
U.S. PATENT DOCUMENTS
2,004,182  6/1935  Arey ..................... 24/279
2,795,835  6/1957  Kreidel et al. .......... 24/280

FOREIGN PATENT DOCUMENTS
1450354 12/1968 Fed. Rep. of Germany ............. 24/279

Primary Examiner—Kenneth Dorner

[57]    ABSTRACT

A fastening of the jubilee clip type in which the ends of the clamping strip are bent into pockets around filler pieces through which a tightening screw is threaded. To promote ready assembly and simple manufacture of such clips the holes and apertures in the filler pieces and clamping strip for the passage of the tightening screw are marginally formed by countersinking, chamfering, and flanging for quick positive engagement.

8 Claims, 5 Drawing Figures

4,195,393

JUBILEE CLIP FASTENING

BACKGROUND OF THE INVENTION

This invention relates to a fastening of the jubilee clip type in which the two ends of the clamping strip forming the main body of the clip are bent U-fashion around filler pieces, at least partially of polygonal section, through which a tightening screw is passed, these filler pieces in each case having openings at the two sides for the passage of the tightening screw.

In the prior art, and specifically as is disclosed in German Patent Publication DE-GM 1 850 247, the filler pieces are substantially rectangular in cross section and are wholly embraced by the clamping strip, and the free ends of this strip are welded or soldered to the main body of the strip. Detachment of filler pieces wholly surrounded by the clamping strip in this way is prevented by crimping or beading provided along the edges, but the technical expense involved in mass production is excessive because it involves handling the strip and the filler pieces at a plurality of states in the system to maintain them in working position.

It is an object of the invention to provide an effective and useful jubiliee clip fastening of the above type which can be manufactured using simple industrial expedients. A further object is a fastening of this type in which the filler pieces can be inserted quickly and readily into effective working position.

A further object is a fastening of this type which can be assembled quickly to give a firm positive engagement.

SUMMARY OF THE INVENTION

In pursuance of these objectives the present invention provides in a jubilee clip fastening of the type comprising a clamping strip with free end portions, two filler pieces each with a hole therethrough disposed in side by side relationship adjacent the free end positions, each free end being formed into a pocket to engage around one of the filler pieces, and a tightening screw passing through the holes in the filler pieces and through corresponding apertures in the adjacent overlying sections of the clamping strip, including the improvement whereby each of the filler pieces is formed having a recession in or surrounding at least one hole end and the mating and engaging part of the corresponding overlying sections of the clamping strip are inset for retentive engagement in this recession.

The recessed portions referred to may be formed by countersinking, for example of rectangular cross section, and/or by chamfering. The associated engagement parts of the clamping strip will be of complementary structure. In one arrangement, for example, one at least of the filler pieces is provided with countersunk portions at the two side faces thereof in mirror-image arrangement.

In a further feature of the invention the hole through one of the filler pieces is internally screwthreaded and the corresponding overlying section of the clamping strip at one end at least of the hole is formed to provide an interference tongue for engagement in the screw threading of the tightening screw threaded through the hole.

BRIEF DESCRIPTION OF THE DRAWINGS

Embodiments of the invention are illustrated in the accompanying drawings, in which.

DESCRIPTION OF THE PREFERRED EMBODIMENT

Figure 1:
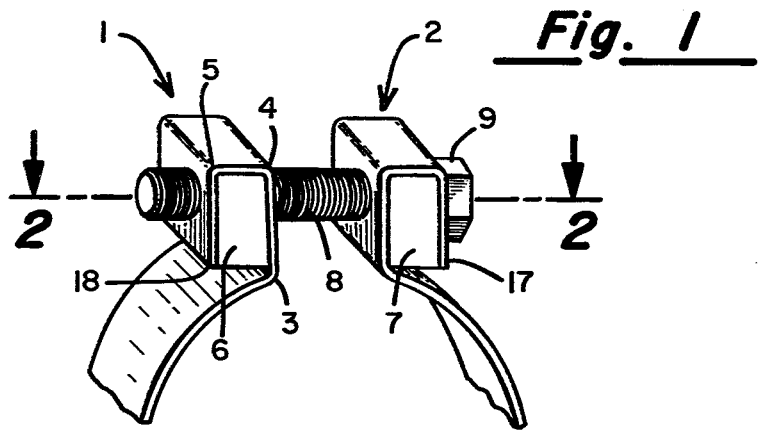
FIG. 1 is a perspective illustration of a jubilee clip fastening according to the invention.

The clip fastening illustrated comprises a metal strip the free ends of which are denoted 1 and 2; each of these ends is bent at three fold lines 3, 4 and 5 to form a pocket receiving a filler piece, 6 and 7 respectively, of rectangular cross section. The ends 1 and 2 of the strip carrying the filler pieces are held together in the usual way by a tightening screw 8 which allows them to be moved relatively to one another. The headed end 9 of the tightening screw is adjacent the strip end 2 and the free threaded end of this screw is adjacent the strip end 1.

Figure 2:
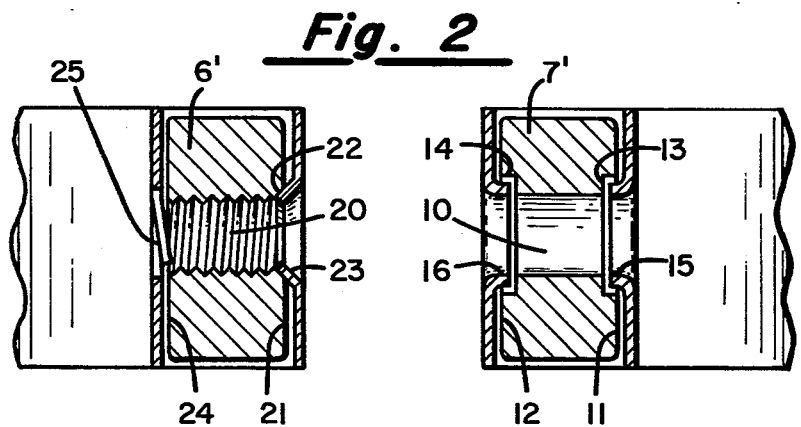
FIG. 2 is a section on the line II—II of FIG. 1 on an enlarged scale with the tightening screw omitted.

In conformity with this the filler pieces which are shown as 6' and 7' in FIG. 2, are of different construction; although they are externally of like dimensions. The filler piece 7' has a smooth walled central hole 10 which guides the shank of the clamping screw. Countersunk portions 13 and 14 of rectangular section are provided at the two ends of hole 10, respectively at the front face 11 and the rear face 12. The end 2 of the clamping strip is correspondingly cut out and the margins around these cut outs are flanged at 15 and 16 to engage in the countersunk portions.

As can be seen from FIG. 1 the free edges 17 and 18 respectively of the strip ends 1 and 2 are turned downwards toward the main body of the strip because it is only necessary for the filler piece to be embraced from three sides—leaving the bottom open—in the case of the rectangular cross section here involved. The circular impressed flange(s) provided in the case of the right-hand part of the illustration in FIG. 2 prevents accidental loss of the filler piece 7' from the fastening, even when the tightening screw is entirely removed; guided entry of the screw 8 into the hole 10 is also always sure.

The filler piece 6' associated with the other end of the strip is provided in the usual way with a screwthreaded hole 20. A bevel 22 is provided around this hole at the end face 21 of this filler piece, this accommodating the correspondingly beveled and flanged edge 23 of a hole in the strip end. No provision is made for any additional connection between the clamping strip and the filler piece 6' at the rear face 24 of the latter; however, this could be provided without any difficulty. In this event the clamping strip would be provided at the emergent end of the tightening screw with an interference tongue 25 so formed that it obtrudes at least partially into the threading in the filler piece 6' and thus protects the latter at the rear face 24.

The filler pieces 6, 7 or, as described at 6' and 7', may be of metal; they could however be of a plastics material.

Figures 3, 4, 5:
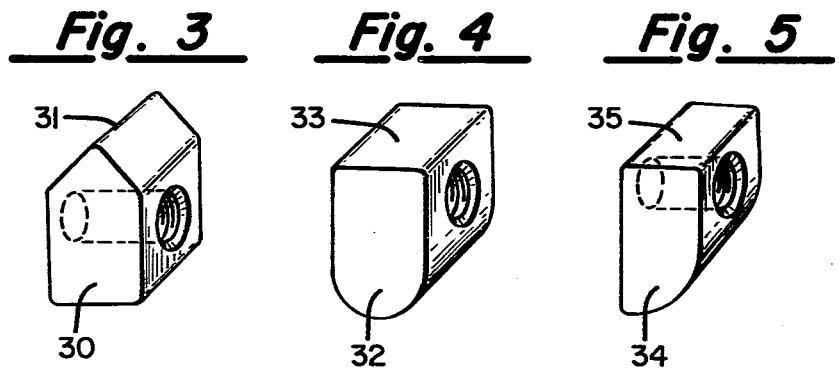
FIGS. 3 to 5 show different embodiments of the filler piece.

The modified form of filler piece illustrated in FIG. 3 may have a smooth hole therethrough or this may be screw-threaded. The piece has a plane bottom face 30 and, at the opposite end, a portion 31 of gable-end section. Even with a shape of this character it is only necessary to bend the corresponding end of the clamping strip in U-fashion around the filler piece and it will be held against loss by the aforementioned countersunk formations, chamfers, or flanged edges. The filler piece will always keep its centered position as with all other versions of the invention.

In the embodiment illustrated in FIG. 4, the bottom face 32 is rounded nearest the main body of the clamping strip, whilst the side 33 facing away from the main body is flat. In all embodiments of the filler piece the corners or "sharp edges" which are provided at the side facing away from the clamping strip are particularly advantageous in holding the filler piece against shifting.

The filler piece embodiment illustrated in FIG. 5 has a bottom face 34 which is rounded at one side, whilst the top face 35 has a flat surface which extends at right angles to the adjacent surface of the item.

It is apparent that instead of using countersunk, recessed, or flanged parts which are inturned relatively to the filler piece the required retention of the latter can alternately be achieved by threaded or part-threaded plate formations. It will also be appreciated that the offset margins of the aperture at the rear face 11 of the filler piece 7' (see FIG. 2) could also be used at the filler piece 6', or at the latter only.

I claim:

1. Fastening clamp comprising a metal clamp strip including each free end bent away from said strip into a U-shaped member forming a pocket of a geometric cross-section; an angular filler piece received in each pocket of said U-shaped member; one of said angular filler pieces including a smooth wall central hole and other of said angular pieces including a threaded screw hole; a tightening screw passing through said smooth wall central hole and screwed into said threaded screw hole to move each end relative to the other end; said filler piece having said smooth wall central hole including at least one countersunk section provided at an end face of said smooth wall central hole and said filler piece having said threaded screw hole including a bevel at an end face of said filler piece whereby holes in said ends of said strap are correspondingly cut out and the ends of said strap around each of said cut outs are flanged to engage said countersunk section and said bevel respectively.

2. The fastening clamp of claim 1 wherein said countersunk section is a countersunk shoulder forming a right angle cross-section portion.

3. The fastening clamp of claims 1 or 2 wherein said filler piece having said smooth wall central hole includes two countersunk sections on two opposing side faces and being mirror images to each other and including mirror image cut outs in said strap.

4. The fastening clamp of claim 1 wherein at least one of said filler pieces has a rectangular cross-section.

5. The fastening clamp of claim 1 wherein at least one of said filler pieces has a pentagonal cross-section.

6. The fastening clamp of claim 1 wherein at least one of said filler pieces has a semicircular cross-section.

7. The fastening clamp of claim 1 wherein at least one of said filler pieces has a quarter-circular cross-section.

8. The fastening clamp of claim 1 wherein said strap end which retains said filler piece having said screw threaded hole comprises an extending tongue means at least partially obtruding into said threaded hole in said filler piece whereby said tightening screw engages against said tongue means into locking engagement with said tongue during screwing of said threaded screw.

* * * * *